United States Patent [19]

Maxwell, Jr.

[11] 4,202,515
[45] May 13, 1980

[54] TWO TONE TRACKER

[75] Inventor: Richard F. Maxwell, Jr., Baltimore, Md.

[73] Assignee: The United States of America as represented by the Secretary of the Army, Washington, D.C.

[21] Appl. No.: 922,011

[22] Filed: Jul. 5, 1978

[51] Int. Cl.² ............................................. F42B 15/02
[52] U.S. Cl. .................................................... 244/3.11
[58] Field of Search ..................... 244/3.11, 3.12, 3.13, 244/3.14; 250/203 R

[56] References Cited

U.S. PATENT DOCUMENTS

| | | | |
|---|---|---|---|
| 3,366,346 | 1/1968 | McKnight et al. | 244/3.11 |
| 3,598,344 | 8/1971 | Walters et al. | 244/3.11 |
| 3,657,547 | 4/1972 | Mansfield | 250/203 R |
| 3,782,667 | 1/1974 | Miller, Jr. et al. | 244/3.13 |
| 3,796,396 | 3/1974 | Cravella | 244/3.11 |
| 3,807,658 | 4/1974 | Miller, Jr. et al. | 244/3.13 |
| 3,998,406 | 12/1976 | Smith et al. | 244/3.11 |
| 4,027,837 | 6/1977 | Miller, Jr. et al. | 244/3.11 |

Primary Examiner—Charles T. Jordan
Attorney, Agent, or Firm—Nathan Edelberg; Robert P. Gibson; Freddie M. Bush

[57] ABSTRACT

A command-to-line-of-sight missile tracking system which employs spectral wavelength diversity and amplitude modulation of a beacon to effect an optical FM data link. The disclosed system provides advantages of suppression of interference radiation within the tracker field of view and relative simplicity of tracker mechanization.

6 Claims, 6 Drawing Figures

ON AXIS

OFF AXIS

TWO TONE TRACKER

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE DISCLOSURE

Typical contemporary command-to-line-of-sight missile systems operate by optical measurement of the deviation of the missile from the desired line-of-sight and by commands to the missile to close the loop and restore the missile to this desired path. The optical tracker is located at the launcher. Deviation of the missile from the desired path results in correctional commands being encoded and coupled to a transmitter from which commands are transmitted via a data link which may be radio, optical, or wire. A beacon is employed on the missile to provide a source for the optical tracker. The beacon is modulated to provide a signature to permit the tracker to recognize the beacon and discriminate against background radiation. The contemporary systems employ amplitude modulation. The accuracy of the tracking, or error measurement, required in the missile system precludes the use of a mechanization which depends on the magnitude of the optical signal. In addition to the large changes in magnitude produced by the change in distance (range), variations in missile attitude and atomspheric phenomena produce significant changes in signal level. The classic method for error measurement, employed in most systems, utilizes beacon image nutation on a cruciform or quadrant detector, as shown in FIG. 1. The center of optical nutation of the image nutator 2 is aligned with the boresight axis of the sight which establishes the desired line-of-sight (LOS) and flight path. When the missile beacon image is on the LOS, the nutated image 4 describes a circle which is concentric with the center of the detector 6 as shown in FIG. 2. When the beacon is not on the LOS, the nutated image 4 is not concentric with the detector 6 center and appears as shown in FIGS. 1 and 3.

Measurement of beacon (and missile) LOS errors is made from the geometry and the times at which the image crosses the detector cross hairs. For example, the vertical error $E_v$ is equal to r sin $\theta$, and the horizontal error $E_h$ is equal to r sin $\phi$ where r equals nutation radius in feet, $\theta$ equals vertical nutation angle error in radians, and $\phi$ equals horizontal nutation angle error in radians. In actual practice, the nutation radius angle may be programmed as a function of time, based on missile range, to provide a constant value for r. The quantities sin $\theta$ and sin $\phi$ are obtained by sampling nutation reference generator signals and are the times of crossing the horizontal and vertical detector cross hairs. The accuracy of the error measurement is a direct function of the accuracy in determining the time of the crossings. A method of signal processing which has been used in the past is shown in FIG. 4. A detector 10 has four detector quadrant signals A1, B1, A2, and B2 which are processed into two channels. One channel 12 provides a reference signal whose amplitude is constant. The other channel 14 provides a signal of the same frequency, but which reverses phase 180 degrees from one quadrant to the next. A phase detector 16 is then employed to provide an output which changes level at the detector crossover points. The phase detector output is then used to initiate sampling of the nutation reference signals to provide error readings in vertical and horizontal channels.

SUMMARY OF THE INVENTION

By employing narrow spectral band emitters in a missile beacon and utilizing the inherent capabilities of these emitters, the emitters can be operated at separate frequencies. A spectral filter allows the respective center wavelengths of the emitters to be alternately selected during nutation of the signal. The amplitude of the respective FM signals do not reduce to zero at the quadrant crossover points, providing effective pulse interference suppression.

DESCRIPTION OF THE PREFERRED EMBODIMENT

Figure 1:
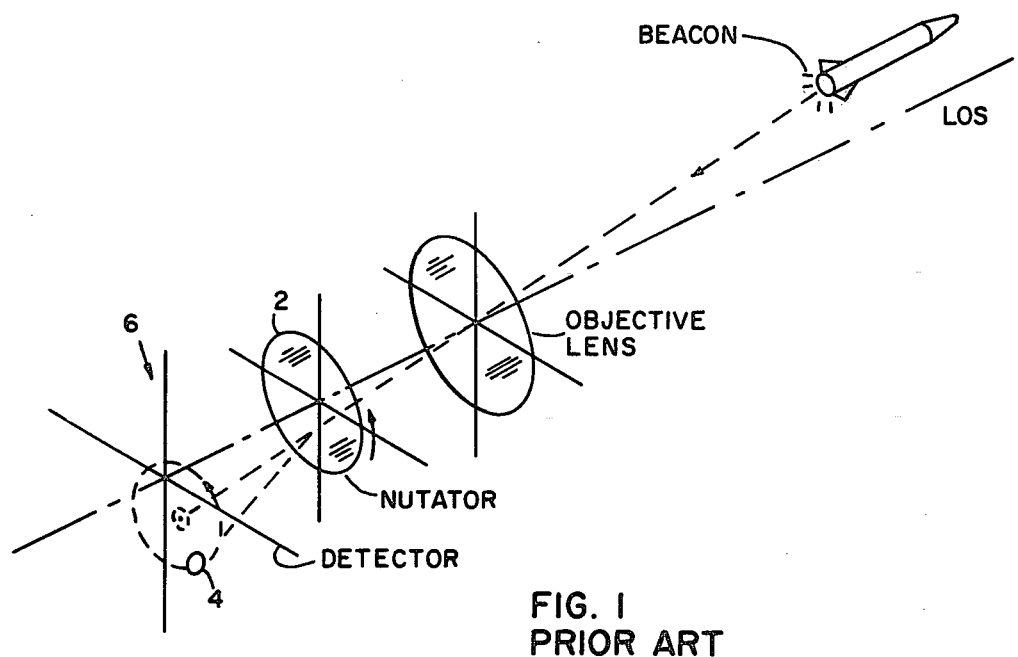
FIGS. 1–4 are typical prior art drawings for error measurement systems utilizing beacon image nutation with quadrant detection.
Figure 2:
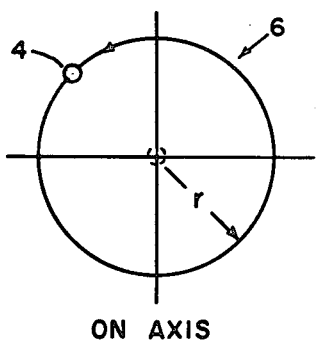
Figure 3:
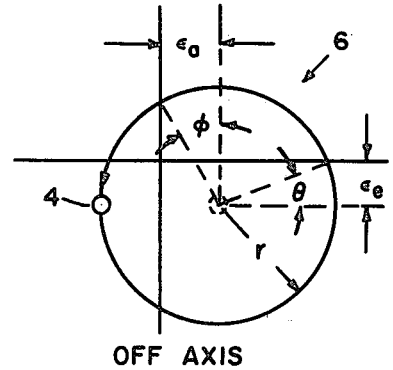
Figure 4:
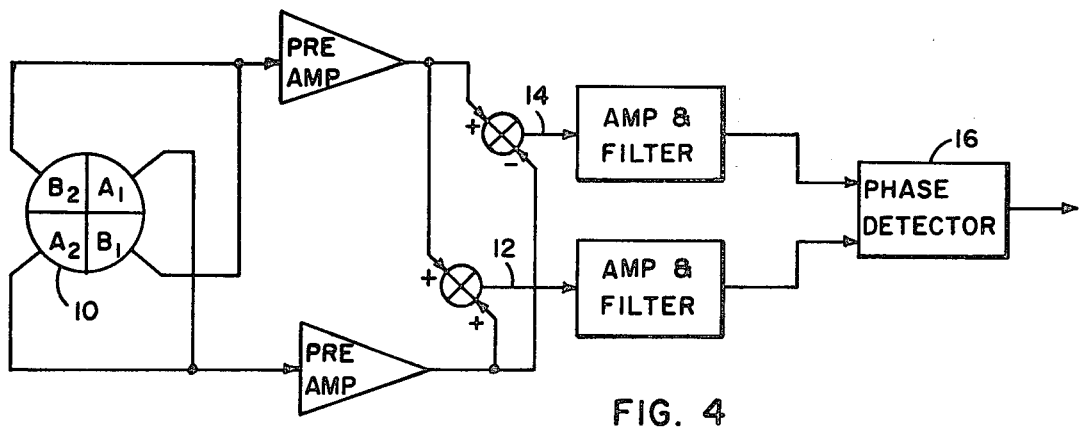
Figure 5:
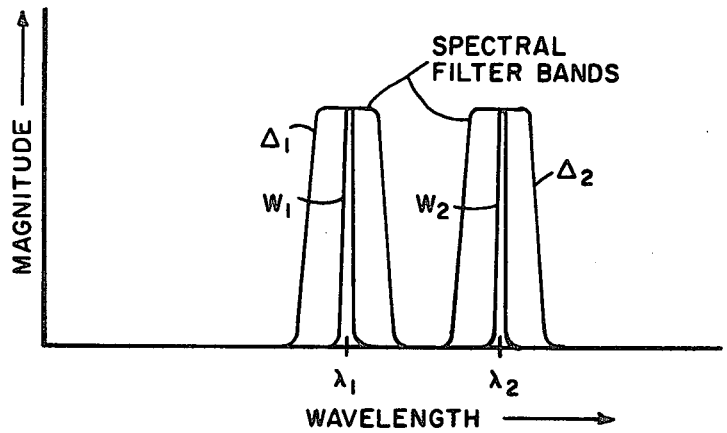
FIG. 5 diagrammatically shows the frequency modulation of separate wavelengths within the spectral band of the optical filter which discriminates between the frequencies.

Referring now to the drawings, FIG. 5 discloses the missile beacon to employ two emitters operating at separate wavelengths ($\lambda$) and modulated by separate frequencies (W). Spectral filters within the tracker have separate pass bands ($\Delta$) for receiving and passing the respective wavelengths within that band.

Figure 6:
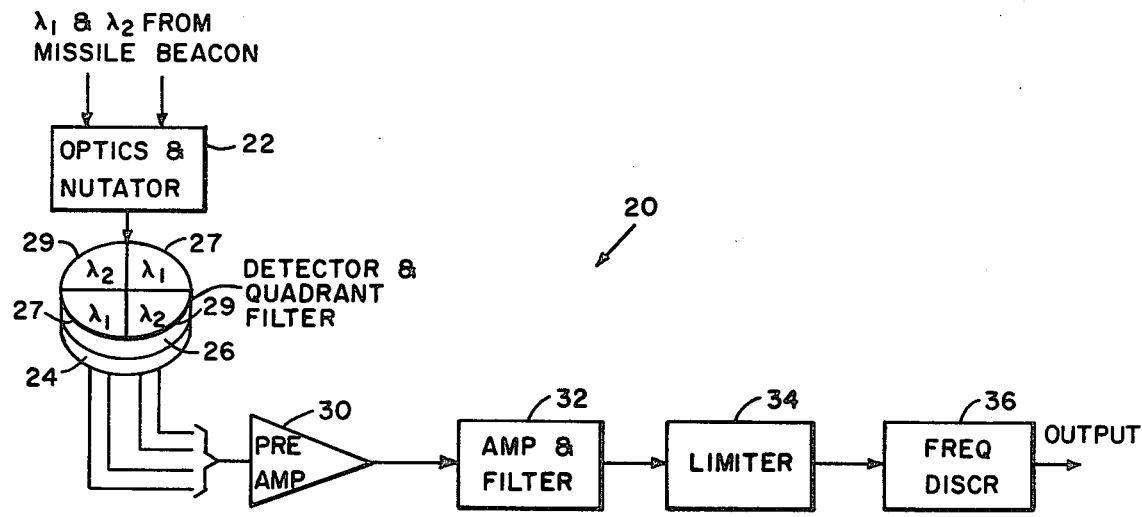
FIG. 6 is a block diagram of a preferred embodiment of the invention.

A two tone tracker is shown in block diagram in FIG. 6. Tracker 20 is adapted for receiving impinging signals $\lambda_1$ and $\lambda_2$ from the missile beacon and for providing a discriminator output to following load circuitry such as guidance, error indicator, or alarm circuits. By employing narrow spectral band emitters in the beacon and utilizing the inherent capabilities of these devices, signal processing is enhanced while increased security is obtained since the different modulation frequencies and separate wavelengths are more difficult to measure. Effects of jamming are less than prior art systems because of the inherent interference rejection characteristic of frequency modulation compared to amplitude modulation.

The missile beacon (not shown) contains two sets of light emitting diodes at center wavelengths $\lambda_1$ and $\lambda_2$. These diodes are amplitude modulated (AM) at respective different frequencies, W1 and W2 as shown in FIG. 5. Tracker 20 employs beacon optics and image nutation 22 to derive vertical and horizontal error measurements as previously described and established in the prior art. However, a single detector 24 responds to wavelengths $\lambda_1$ and $\lambda_2$. A spectral filter 26, consisting of bandpass filters 27 and 29, centered at $\lambda_1$ and $\lambda_2$ are disposed adjacent alternate quadrants of detector 24. A preamplifier 30 is disposed to receive the electrical outputs from the respective quadrants of detector 24 and couple these signals to an amplifier and filter circuit 32. The output of amplifier and filter circuit 32 is coupled through a limiter 34 to frequency discriminator 36. As the beacon image is nutated on filter 26, the detector responds alternately to wavelengths $\lambda_1$ and $\lambda_2$ and produces alternate electrical signals at the modulation frequencies W1 and W2. The signal shifts between W1 and W2 at the crossover points between the respective quadrants.

The signal is processed as a frequency modulated signal. The output of discriminator 36 changes levels at the crossover points and is used to initiate the sample pulses in much the same manner as the phase demodulator output of prior art systems. The change in level of the discriminator output occurs as the optical image moves from one quadrant to another and provides an electrical signal change which permits this event to be detected. Sample pulses are generated at the crossover points. These pulses are narrow (typically 100 microseconds in time duration) and are used to gate, or sample sinusoidal reference voltages to obtain the error functions. The detection of the crossover of the optical image from one quadrant to another is detected, by the change in the frequency of the signal. In prior systems a change in phase (of 180 degrees) occurs at the crossover and is detected by a phase demodulator. Thus, frequency discriminator 36 has a voltage output which is proportional to the frequency of the input. A change in frequency of the input will thus produce a change in the output voltage. This change provides a means for immediate detection of the crossover event.

Prior art systems, employing phase modulation, are essentially single carrier frequency systems which are modulated by a polarity reversing signal. As the modulating signal goes through zero, the carrier also goes through zero. It is in this critical region that the system is subject to errors due to noise and extraneous pulse interference. In the two tone tracker the operation is such that the carrier shifts from one frequency to another and the amplitude remains constant. This provides increased immunity to noise and extraneous pulses. The inherent ability of FM systems to suppress pulse interference is well known. This characteristic is a result of the high degree of amplitude limiting which can be employed before the signal reaches the discriminator. The use of two narrow bandpass spectral filters provides a suppression of nutation generated signals from unmodulated radiant sources which results from the fact that the amplitude of such signals will be equal to the difference of the energy in the two bands rather than the total energy in the spectral passband of a conventional tracker. Since the amplitude of the FM signal does not reduce to zero at the crossover point, effective pulse interference suppression via limiting is provided in this critical area. For signal noise ratios in excess of approximately 4, the output signal to noise of an FM system is greater than that of an AM system. The two tone, or FM, tracker mechanization is less complicated than the conventional type, allowing the use of a single detector channel which permits economies in size and cost as well as increased reliability.

Although a particular embodiment and form of this invention has been illustrated, it will be apparent to those skilled in the art that modification may be made without departing from the scope and spirit of the foregoing disclosure. Therefore it should be understood that the invention is limited only by the claims appended hereto.

I claim:

1. A tracking system for line-of-sight missile tracking comprising: a photoemissive beacon having first and second optical emitters disposed within a missile housing, said emitters being adapted for emitting respective first and second optical wavelength signals; tracking means remotely located from said beacon and having optically sensitive detector means responsive to said optical wavelengths for providing electrical output signals in response to impinging optical signals, amplifier means responsive to said detector means output for amplifying said electrical signals, and discriminator means responsive to said amplified signals for providing an output signal indicative of deviation of said missile from the line-of-sight of the target.

2. A tracking system as set forth in claim 1 wherein said first and second optical wavelength signals are modulated at respective first and second frequencies; and further comprising nutating means disposed between said optically sensitive detector means and impinging optical wavelengths for nutating signals passing therethrough.

3. A tracking system as set forth in claim 1 and further comprising nutating means disposed between the optical detector means and impinging optical wavelengths for nutating signals passing therethrough; and optical filter means disposed between said nutating means and said optical detector means for passing said first and second wavelengths at selected alternate intervals during nutation of said signals.

4. A tracking system as set forth in claim 3 wherein said filter means is defined by four parts formed by rectangular coordinate axes for alternately passing said first and second wavelengths during respective 90 degree intervals of nutation of said signals on said filter.

5. A tracking system as set forth in claim 4 wherein said first and second optical wavelength signals are modulated at respective first and second frequencies.

6. A tracking system as set forth in claim 5 wherein said detector means output signal alternates between first and second output voltages in response to respective first and second modulation frequencies received by said detector means, said output signal changing at 90° intervals of rotation as impinging nutated signals cross respective coordinate axes.

* * * * *